(12) United States Patent
Lesniak et al.

(10) Patent No.: US 6,183,658 B1
(45) Date of Patent: Feb. 6, 2001

(54) PROCESS FOR PREPARING AGGLOMERATE-FREE NANOSCALAR IRON OXIDE PARTICLES WITH A HYDROLYSIS RESISTANT COATING

(75) Inventors: Christoph Lesniak, Obergünzburg; Thomas Schiestel, Saarbrücken; Rüdiger Nass, Riegelsberg; Helmut Schmidt, Saarbrücken-Güdingen, all of (DE)

(73) Assignee: Institut für Neue Materialien gem. GmbH, Saarbrücken (DE)

( * ) Notice: Under 35 U.S.C. 154(b), the term of this patent shall be extended for 0 days.

(21) Appl. No.: 09/171,065

(22) PCT Filed: Apr. 9, 1997

(86) PCT No.: PCT/EP97/01758

§ 371 Date: Oct. 9, 1998

§ 102(e) Date: Oct. 9, 1998

(87) PCT Pub. No.: WO97/38058

PCT Pub. Date: Oct. 16, 1997

(30) Foreign Application Priority Data

Oct. 4, 1996 (DE) ............................................... 196 14 136

(51) Int. Cl.$^7$ .............................. C09D 17/00; C09C 1/24; C09C 3/12
(52) U.S. Cl. .................................... 252/62.56; 252/62.54; 252/62.52; 106/460; 106/456; 427/600; 427/601; 427/220; 428/405
(58) Field of Search .............................. 428/405; 427/600, 427/601, 220; 252/62.56, 62.54, 62.52; 106/460, 456

(56) References Cited

U.S. PATENT DOCUMENTS

| 4,169,912 | * | 10/1979 | Schonafinger et al. ............... 428/145 |
| 5,718,907 | * | 2/1998 | Labarre ................. 424/401 |
| 5,922,403 | * | 7/1999 | Tecle .................................. 427/220 |

FOREIGN PATENT DOCUMENTS

| 5-277355 | * | 10/1993 | (JP) . |
| 6-270155 | * | 9/1994 | (JP) . |
| 96/02060 | * | 1/1996 | (WO) . |

* cited by examiner

Primary Examiner—C. Melissa Koslow
(74) Attorney, Agent, or Firm—Heller Ehrman White & McAuliffe LLP

(57) ABSTRACT

A process for preparing an agglomerate-free suspension of nanosize iron-containing oxide particles coated in a stable manner comprises preparing an aqueous suspension of nanosize iron-containing oxide particles which are partially or completely in the form of agglomerates; adding a trialkoxysilane and a water-miscible polar organic solvent which has a boiling point at least 10° C. higher than the boiling point of water; treating the resulting suspension with ultrasound until at least 70% of the particles present are in the range of ±20% of the average particle diameter; removing the water by distillation under the action of ultrasound; and separating the non-disintegrated agglomerates.

20 Claims, No Drawings

PROCESS FOR PREPARING AGGLOMERATE-FREE NANOSCALAR IRON OXIDE PARTICLES WITH A HYDROLYSIS RESISTANT COATING

The present invention relates to a process for producing agglomerate-free nanosize iron-containing oxide particles, i.e. iron-containing oxide particles having a particle size (a mean particle diameter) of the primary particles of not more than 100 nm, preferably not more than 40 nm and in particular not more than 30 nm, which have a very hydrolysis resistant coating based on silane (core-shell structure).

Particularly for the production of superparamagnetic iron oxide particles, nanosize particles are usually produced via a precipitation process and attempts are subsequently made, by means of surface modifiers, to prevent a growing together of the primary particles (superparamagnetism requires a particle size of at most about 30 nm) or to break up agglomerates which have already formed and to prevent the primary particles thus formed from reagglomerating. As can be seen from the literature, surface modification alone, e.g. using functional silanes, achieves only a moderately deagglomerated product. This makes probable a strong bond between nanosize primary particles which is not broken up by the surface modifier. The additional input of energy by means of ultrasound, as already described in the literature, also does not change this in any fundamental way.

However, the use as surface modifier of functional silanes, i.e. silanes which have not only hydrolysable or condensable groups (e.g. alkoxy groups) via which both bonding of the silane to the surface of the metal oxide particles and condensation of silane molecules already bound to the surface with one another to form Si—O—Si bonds can take place but also contain functional groups bound to nonhydrolysable hydrocarbon groups which functional groups make it possible, after the metal oxide particles have been coated, for a variety of species (e.g. via molecules) to be bound to the particles is highly desirable for the reasons just mentioned provided that a way can be found of breaking up agglomerates into the primary particles of which they are composed during surface modification (coating) and providing these primary particles with a stable coating which does not become detached again from the surface of the particles even under unfavourable conditions, thus reliably preventing agglomeration of the primary particles.

Monomeric or oligomeric silanes bound to the surface of metal oxide particles are, however, quite generally very hydrolysis-sensitive. This problem is increased when, in particular, the functional silane used as surface modifier has functional groups which can catalyse hydrolytic cleavage of the (in any case relatively weak) metal—O—Si bond, as occurs, for example, in the case of aminosilanes, so that the silane species already present on the primary particles are detached again from the particle surface under very mild conditions (by hydrolysis) and thus leave an (at least partly) uncoated primary particle which can form an agglomerate with other particles of this type and generally will also do so since nanosize particles quite generally have a strong tendency to agglomerate formation if they are not prevented from doing so by appropriate measures.

In this context, it may be pointed out that agglomerates present a problem for many applications even if their dimensions are within the desired or still acceptable (nanosize range) because of their irregular shape (in contrast thereto, primary particles are essentially spherical) and their susceptibility to mechanical stress (disintegration into smaller agglomerates and/or primary particles) This applies even to (stably) coated agglomerates, since should they disintegrate they leave smaller agglomerates and/or primary particles which are not coated or only partly coated and can thus result in the formation of new (possibly even larger) agglomerates.

It is thus an object of the present invention to provide a process for producing (essentially) agglomerate-free nanosize iron oxide particles (in particular superparamagnetic oxide particles) which not only makes it possible to break up existing primary particle agglomerates efficiently but also leads to primary particles which have a hydrolysis-resistant coating based on functional silanes (in particular based on aminosilanes) so as to reliably prevent them from (re) agglomerating.

According to the invention, it has surprisingly been found that the above object can be achieved by a process for producing an (essentially) agglomerate-free suspension of stably coated nanosize iron-containing oxide particles, which comprises the following steps in the order indicated:

(1) preparation of an aqueous suspension of nanosize iron-containing oxide particles which are partly or completely present in the form of agglomerates;

(2) addition (i) of a trialkoxysilane which has a hydrocarbon group which is directly bound to Si and to which at least one amino, carboxyl, epoxy, mercapto, cyano, hydroxy and/or (meth)acrylic group is bound, and (ii) of a water-miscible polar organic solvent whose boiling point is at least 10° C. above that of water;

(3) treatment of the resulting suspension with ultrasound until at least 70% of the particles present have a size within the range from 20% below to 20% above the mean particle diameter;

(4) removal of the water by distillation under the action of ultrasound; and (5) removal of the agglomerates which have not been broken up.

The above step (5) is preferably followed by, as step (6), removal of salts from the (essentially nonaqueous) suspension which has been freed of agglomerates.

In particular, it has been found according to the invention that the polycondensation of the silane species used on the particle surface which is necessary for the stable coating of the (primary) particles can be achieved efficiently under the above conditions.

The iron-containing oxide particles used according to the invention are usually ones which may, if desired, contain not only iron ions but also other (preferably divalent) metal ions, preferably of metals selected from the group Zn, Cu, Co, Ni and/or Mn, where the content of these metals preferably does not exceed 70 metal atom % and in particular 35 metal atom %. Metals other than those mentioned may also be present in the iron-containing oxide particles, e.g. alkaline earth metals such as Ca and Mg. However, the iron-containing oxide particles are preferably pure iron oxide particles and in particular ones containing both Fe(III) and Fe(II), with the Fe(II)/Fe(III) ratio preferably being from 1/1 to 1/3. Superparamagnetic iron oxide particles are particularly preferred.

The above steps of the process of the invention are described in more detail below.

Step (1)

In step (1), an aqueous suspension of nanosize iron-containing oxide particles which are partly or completely present in the form of agglomerates is prepared. This suspension normally has a solids content of from 1 to 30% by weight, preferably from 2 to 20% by weight and particularly preferably from 3 to 10% by weight and its pH is generally from slightly acid to neutral, e.g. pH 4.5 to 7.

The origin of the agglomerated nanosize iron-containing oxide particles is of no importance, but they will usually originate from a precipitation process as is described below by means of a preferred embodiment. However, it is also possible to use, for example, iron-containing oxide particles prepared in a micro emulsion as starting materials for the process of the invention.

Finally, it may be remarked that the aqueous suspension can of course also contain (water-soluble) species which originate from the preceding steps of the iron-containing oxide preparation as long as these do not adversely affect the process of the invention, i.e. in particular do not prevent or hinder the bonding of the silane to the particle surface and the condensation between silane molecules. Such species are, for example, ions derived from inorganic and organic acids and bases, oxidizing agents, etc.

Step (2)

In step (2), a particular trialkoxysilane and also a particular water-miscible polar organic solvent are added to the above aqueous suspension of iron-containing oxide particles. The addition can be carried out simultaneously or successively in either order. Preference is given to adding the silane first.

The trialkoxysilanes which can be used are preferably ones in which the alkoxy groups are identical and have from 1 to 4 carbon atoms. Particular preference is given to trimethoxysilane and triethoxysilane. The fourth group bound to the silicon is a hydrocarbon group which preferably has from 2 to 20, in particular from 3 to 10, carbon atoms. This is particularly preferably a (cyclo)aliphatic group which may be interrupted by one or more —O— and/or —NR— (R=H or $C_{1-4}$-alkyl) groups. It may also have one or more carbon—carbon double or triple bonds. This group is joined to the silicon atom via an Si—C bond. Furthermore, this hydrocarbon group must have at least the one amino, carboxyl, epoxy, mercapto, cyano, hydroxy and/or (meth)acrylic group, where these groups are also intended to include derivatives (e.g. ester, anhydride and acid halide in the case of carboxyl and monoalkylamino, dialkylamino and trialkylammonium in the case of amino). Of course, two or more differed functional groups can also be bound to such a hydrocarbon group. According to the invention, preference is given to using trialkoxysilane having at least one amino group (hereinafter referred to as aminosilanes). Specific examples of such aminosilanes are 3-aminopropyltriethoxysilane, N-aminoethyl-3-aminopropyltrimethoxysilane, trimethoxysilylpropyl-diethylenetriamine and N-(6-aminohexyl)-3-aminopropyltrimethoxysilane.

If aminosilanes are used, it must be remembered that it is generally necessary to add sufficient acid to the suspension for a distinctly acid pH to be obtained (in the range from 1 to 5, preferably from 2 to 4). A particularly preferred acid for this purpose is glacial acetic acid. When silanes without amino groups are used, the addition of acids may be omitted, although in some cases such an addition can likewise be favourable.

It is of course also possible to use two or more trialkoxysilanes having (if desired) different functional groups. The amount of trialkoxysilane added is preferably from 40 to 120% by weight, in particular from 60 to 100% by weight (based on iron-containing oxide), with the results generally being obtained using from 75 to 85% by weight of silane. Silane contents which are too high lead to crosslinking of the iron-containing oxide particles and thus to larger particle diameters, while contents which are too low result in incomplete coating of the individual particles and thus to a less stable suspension.

In addition to the abovementioned silanes, it is also possible to mix tetraalkoxysilanes into the suspension. Silanes preferred for this purpose are tetramethoxysilane and tetraethoxysilane. The molar ratio of functional trialkoxysilane to tetraalkoxysilane is here preferably in the range from 1:0.05 to 1:10, in particular from 1:0.1 to 1:5 and particularly preferably from 1:0.5 to 1:2. The addition of tetralkoxysilane is particularly advisable for forming a coating in the case of relatively bulky trialkoxysilanes. In addition, this enables the thickness of the coating to be adjusted.

Apart from the silane component, a water-miscible polar organic solvent whose boiling point is at least 10° C., preferably at least 15° C. and in particular at least 20° C., higher than that of water is also added to the iron-containing oxide suspension.

The polar organic solvent is generally one which has at least one, preferably at least two, hydroxy groups bound to carbon atoms. Examples of such solvents are ethylene glycol, propylene glycol, glycerol, trimethylolpropane and diethylene glycol. Particular preference is given to ethylene glycol and glycerol.

The weight ratio of water to the polar organic solvent can be varied within a wide range. In general, this ratio is from 1:0.5 to 1:100, in particular from 1:1 to 1:10 and particularly preferably from 1:1 to 1:2. It is important that sufficient water to hydrolyse the alkoxy groups of the silane component(s) remains in the system. If further hydrolysis-sensitive groups (e.g. ester and/or anhydride groups) are present on the hydrocarbon group bound directly to the silicon of the silane, it may even be necessary to remove the water from the suspension first (e.g. by distillation under reduced pressure) and to add the silane and subsequently the amount of water required for the hydrolysis of the alkoxysilane groups present (the alkoxysilane groups are hydrolysed preferentially) after addition of the polar organic solvent (in order to maintain a suspension).

Step (3)

After the silane component and the polar organic solvent have been added to the iron-containing oxide suspension, the suspension is subjected to ultrasound treatment until at least 70%, preferably at least 75% and particularly preferably at least 80%, of the particles present have a size in the range from 20% below to 20% above the mean particle diameter. The corresponding determination of the particle size distribution is carried out by means of an UPA (Ultrafine Particle Analyzer) by laser light back scattering. Although ultrasound treatment before addition of the silane component and/or the polar organic solvent is likewise possible and likewise leads to breaking up of the agglomerates, it is not very useful since reagglomeration can take place in the absence of the above additives. In contrast, the primary particles liberated from the agglomerates have their surfaces coated in the presence of the above additives, thus hindering reagglomeration.

In step (3), the total ultrasonic energy absorbed by the suspension is of importance. This is made up of:
  the ultrasonic power of the bath ($P''$)
  the duration of ultrasound treatment (t)
  the geometry of the arrangement (G) (the ratio of surface area to volume of the suspension is an important factor here).

The absorbed energy is given by: $E_{abs} \approx P_u \times t \times G$.

For example, over 90% of all agglomerates are destroyed in the case of a suspension in a 500 ml flask at a (low)

ultrasonic power of 25 watt/l and a reaction time of 72 hours. If an ultrasonic bath having a different power is employed, the reaction time has to be adapted correspondingly.

For larger batches and/or less favourable geometric factors, the reaction time likewise has to be adapted. For example, a reaction time of about 10 days generally has to be expected for a 15 l batch in order to achieve the same result as described above.

Monitoring of the degree of agglomeration and thus the product quality can be carried out at any time either visually (transparency of the suspension) or by determination of the particle size.

Although the ultrasound treatment can be carried out at room temperature, it needs to be taken into account that without cooling the ultrasonic energy radiated into the suspension will itself cause a warming of the suspension. The treatment of the suspension with ultrasound (and without cooling) is therefore generally carried out at elevated temperature, e.g. at from 50 to 100° C., in particular from 60 to 90° C.

Step (4)

After the breaking-up of the agglomerates has been completed, the water is removed from the suspension under continuing action of ultrasound. This removal is carried out by distillation, preferably under reduced pressure and at a temperature of not more than 80° C. Of course, it is not necessary for the water to be removed completely (quantitatively), but the residual water content preferably does not exceed 3% by weight, in particular 1% by weight, of the suspension. This removal of the water is necessary to obtain a stable coating of the particles by polycondensation of the silanes on the surface of the same.

Step (5)

Since a certain percentage of agglomerates which have not been broken up or have been broken up incompletely generally remains after the ultrasound treatment, these agglomerates have to be removed in order to produce agglomerate-free iron-containing oxide particles. This removal is preferably carried out by gravity, e.g. by centrifugation, decantation, sedimentation, etc. Preference is given to centrifugation, for example for from 45 to 90 minutes at from 2000 to 3000 g.

Step (6)

The above removal of the agglomerates still present is preferably followed by removal of the ions introduced into the system during the preparation process for the iron-containing oxide and/or the above steps. This removal, which can also be carried out before step (5) (although this is not preferred) is generally carried out by means of dialysis, preferably against deionised water until a conductivity of less than 2 $\mu$s/cm is reached. However, it is also possible to dialyse against other liquids, e.g. against 0.01 molar citrate solution (pH=6.6) or 0.01 molar morpholineethanesulphonic acid (pH=6.15).

If an iron-containing oxide powder instead of a nanosize iron-containing oxide suspension is desired, it is of course possible, preferably after conclusion of the above step (6), to remove the liquid still present (e.g. ethylene glycol), for example by distillation under reduced pressure. Here, the temperature used should, where possible, not exceed 100° C. since particle growth can otherwise occur.

Should the particle size distribution achieved by the above process not be satisfactory (narrow enough) for the intended application (e.g. in medicine), it is of course possible to achieve the particle size distribution required by various methods. These methods include, for example, fractional centrifugation using an ultracentrifuge, fractional phase separation and HGMS (High Gradient Magnetic Separation).

The suspensions produced according to the invention display low tendency towards agglomeration of the nanosize (preferably superparamagnetic) particles present therein even over long periods of time. In particular, the coatings applied to the iron-containing oxide particles are also surprisingly very stable to hydrolysis, especially when aminosilanes are used. These stabilities are determined, in particular, by means of the following methods.

(A) Stability of the suspensions:

The stability of the suspensions was monitored over a period of six months. The suspensions were stable over this time, i.e. no sediment was formed under the action of gravity (decantation, centrifugation).

(B) Stability of the coatings:

The stability of the coatings was tested using the following methods immediately after their production and after six months.

(a) Flocculation experiments:

NaCl solution (3M) was added to the iron-containing oxide suspensions until distinct flocculation was observed. After centrifugation, the Si content of the centrifugate and the supernatant liquid was determined by means of ICP-AES. In all cases, no Si could be detected in the supernatant liquid within the measurement accuracy of ICP-AES.

(b) Thin layer chromatography:

Layer: silica gel; eluant: ethanol; spray reagent: ninhydrin (specific for amino groups).

In no case could migration of the amino groups be observed.

In addition, the stability of the coatings was examined at various pH values using these methods and was monitored over a period of two weeks. At pH values below 2 or above 11, the commencement of decomposition was observed. The hydrolysis occurred within the shortest time (<30 min.) in concentrated acids and alkalis. It is known from the literature that iron oxides are dissolved in concentrated acids while silicate bonds are hydrolysed in concentrated bases.

The addition of salts, exposure to light and changing the temperature (0–120° C.) had no influence on the stability of the coatings.

Since the iron-containing oxide particles still have functional groups on their surface as a result of the surface modification with functional silanes (e.g. amine groups in the case of aminosilanes), there are many opportunities for further processing or further modifying them. Thus, for example, hydrophobic particles which can be redispersed in nonpolar organic solvents can be produced by reacting the aminosilane-modified iron-containing oxide particles with fatty acids. Furthermore, crown ethers, complexing agents, biomolecules, etc., can be coupled to the functional groups via chemical bonds.

Nanocomposite particles can be produced, for example, by mixing aqueous suspensions of the iron oxide nanoparticles with hydrolysable compounds (e.g. alkoxides) of silicon, titanium, zirconium, etc., or corresponding sols and subsequent hydrolysis/condensation, thus making it possible to produce filled glass-like films, or by mixing with monomeric epoxides, making it possible to produce nanocomposite layers by polymerisation, or mixing with alkoxysilanes and hydrolysis in water-in-oil emulsions, thus making it possible to produce particulate nanocomposites which can be used, for example, for the separation of biomolecules or for the separation of toxic inorganic and organic substances.

Further possible applications of the products produced according to the invention are, for example:

for coating purposes by the sol-gel process (glass sheets, glass fibres, ceramic surfaces, metal surfaces, powders (particles having a core-shell structure))

as precursors for sol-gel processes as precursors for polymerisation processes (depending on the functional groups)

for magnetooptical applications as sensor materials as magnetofluids.

The preparation of the iron oxide particles which are a preferred starting material for the process of the invention (and lead to a superparamagnetic product) is described below. This preparation comprises the following steps in the order indicated:

(i) Preparation of an aqueous solution containing iron ions in an Fe(II)/Fe(III) ratio in the range from 2/1 to 1/3;

(ii) Precipitation of iron oxide (or hydrated iron oxide) by addition of a base until a pH of at least 8 is reached;

(iii) Heat treatment of the iron oxide until a saturation magnetisation of at least 40 emu/g is reached;

(iv) washing of the heat-treated iron oxide with water;

(v) suspension of the washed iron oxide in water and the setting of the pH of the suspension to a value in the range from 4.5 to 7;

(vi) treatment of the iron oxide with an oxidizing agent.

The following may be said about the above steps.

Step (i)

Iron salts suitable for preparing the aqueous solution containing iron(II) and iron(III) ions are in principle all iron salts which can give such an aqueous solution, e.g. the chlorides, nitrates, sulphates, acetates, etc. of Fe(II) or Fe(III). Preference is given to the chlorides.

The concentration of iron ions in the aqueous solution can fluctuate within a wide range. The concentration of iron(III) is preferably in the range from 0.01 to 1 mol per litre, in particular from 0.1 to 0.6 mol per litre. At a given iron(III) concentration, the concentration of iron(II) depends on the desired Fe(II):Fe(III) ratio. The primary particle size can be controlled to a certain extent via the concentration of the iron ions, with a higher concentration being associated with a smaller particle size.

The Fe(II):Fe(III) ratio is in the range from 2:1 to 1:3, preferably from 1.5:1 to 1:2.5 and in particular from 1:1 to 1:2.2. The ratio of iron (II) to iron (III) also enables the primary particle size to be controlled to a certain extent, with this particle size being lower the higher the proportion of iron(II).

A further possible way of influencing the primary particle size of the precipitated (hydrated) iron oxide in stage (i) is the addition of additives. Examples of such additives are polycarboxylic acids (e.g. oxalic acid) and functional polycarboxylic acids (e.g. citric acid, tartaric acid and glutamic acid) and also salts of these, polyamines (e.g. ethylene diamine), polyethers (e.g. polyethylene glycol) and polyhydric alcohols (e.g. glycerol, polyvinyl alcohol, etc.). Furthermore, phosphates, polyphosphates and functional phosphates can also be used for this purpose. The amount of these additives can be varied within a wide range, e.g. from 0.1 to 40% by weight, in particular from 1 to 20% by weight, based on the iron oxide to be precipitated. The higher the amount of additive added, the lower the mean diameter of the primary iron oxide particles. However, addition of additives to lower the mean particle diameter is generally only desirable if diameters of significantly less than 10 nm are desired.

Step (ii)

In step (ii), a base is added until a pH of at least 8, preferably in the range from 8.5 to 12.5 and in particular in the range from 9 to 11.5, is reached in order to precipitate iron oxide from the aqueous solution containing iron ions prepared in step (i). The base used is preferably an inorganic base such as NaOH, KOH or ammonia, although organic bases such as amines can also be used. Particular preference is given to using a relatively highly concentrated base, for example concentrated ammonia or at least three molar (preferably at least 5 molar) sodium hydroxide solutions. The rate of addition of the base likewise has an influence on the particle size, with the size of the primary particles becoming smaller the faster the base is added. The time of addition is preferably from 1 to 40 minutes, in particular from 5 to 30 minutes and particularly preferably from 10 to 25 minutes (at room temperature).

Step (iii)

The heat treatment of the precipitated iron oxide serves to form well crystallised particles. An index of the crystallisation is the saturation magnetization. Accordingly, the particles should be treated at a temperature and for a period of time which is sufficient to achieve a saturation magnetization of at least 40 emu/g, preferably at least 50 emu/g (without hysteresis being discernible). In general, use is made of temperatures of from 40 to 90° C., in particular from 50 to 80° C. and particularly preferably from 60 to 70° C., and treatment times of from 5 to 30 minutes, in particular from 10 to 20 minutes. Depending on the other process conditions, it is of course also possible to use temperatures and treatment times outside the abovementioned ranges. However, consideration has to be given to the fact that, particularly in the case of particles which have been prepared without addition of additives (see step (i)), a treatment time of more than 30 minutes at temperatures above 90° C. may possibly lead to stronger agglomeration/aggregation of the particles so that the latter ultrasound treatment (step (3) of the process of the invention) has to be carried out for a much longer time and may under some circumstances no longer be sufficient for satisfactory deagglomeration.

On the other hand, the iron oxide prepared with addition of additives tends to form poorly crystallized particles so that a more intense heat treatment may well be necessary for these (e.g. from 1.5 to 2.5 hours at 90° C.). In these cases, the tendency to aggregate is suppressed by the additives. In the case of high additive concentrations (up to 10% by weight) and very small primary particles (<4 nm), a hydrothermal treatment may even be necessary (e.g. in an autoclave at 80 bar, from 120 to 200° C., for 1–4 hours).

Step (iv)

After the heat treatment (and cooling), the iron oxide is washed with water. Deionized (and degassed) water is preferably used for this purpose. Washing can be carried out, for example, by decantation, with the washing operation preferably being repeated until the washings have a pH of at most 10, preferably a pH of at most 9.

Step (v)

After washing, the iron oxide is slurried in water and the pH of the slurry is adjusted to from 4.5 to 7, preferably from 5.5 to 6.5. This pH adjustment is carried out by addition of acid, e.g. a (preferably nonoxidizing) mineral acid such as HCl. However, particularly, when the oxidizing agent to be used in step (vi) is $H_2O_2$, the use of an organic acid, in particular glacial acetic acid, is preferred. On the other hand, steps (v) and (vi) can be combined if the (oxidizing) acid are used for acidification in step (v) is identical with the oxidizing agent to be used in step (vi), for example in the case of nitric acid.

Step (vi)

The iron oxide prepared and treated as described above is treated with an oxidizing agent in order to activate the iron oxide. An oxidizing agent which is preferred for this purpose is $H_2O_2$ (e.g. in the form of a 30 percent strength by weight aqueous solution). In this case, preference is given to adding hydrogen peroxide to the iron oxide suspension until a peroxide concentration in the suspension of from 1 to 5% by weight, in particular from 2 to 4% by weight, is reached. The mixture is in this case stirred at room temperature until gas evolution has ceased. However, the oxidizing agent is not restricted to hydrogen peroxide. Other possible oxidizing agents are, for example, nitric acid (as a concentration of 2 M, about 10 minutes are required for the oxidation at room temperature), iron(III) nitrate (at a concentration of 0.5 M, about 30 minutes are required for the oxidation at 80° C.) and potassium iodate (at a concentration of 0.2 M, about 30 minutes are required for the oxidation at room temperature).

The following example serves to illustrate the present invention.

EXAMPLE (A) Synthesis of the iron oxide particles:

A solution of 0.23 mol of $FeCl_2$ and 0.46 mol of $FeCl_3$ in 1 l of water is degassed using nitrogen. Subsequently, sufficient sodium hydroxide solution (5 molar) to give a pH of 11.5 is added over a period of 20 minutes. The resulting precipitate is heated to 65° C. for 10 minutes and subsequently cooled to room temperature over a period of 5 minutes. The precipitate is then washed with deionized and degassed water until the pH of the washings is 9. The precipitate is suspended in water and the pH of the suspension is adjusted to 6 using glacial acetic acid. 10% by volume of a 30% strength by weight aqueous $H_2O_2$ solution is added to the resulting suspension and the mixture is then stirred until gas evolution has ended, whereupon the suspension is diluted with water to a solids content of 5% by weight of iron oxide.

(B) Surface modification 7.5% by volume of glacial acetic acid is added to the above suspension, followed by the addition of 80% by weight (based on iron oxide) of aminopropyltriethoxysilane. An amount of ethylene glycol corresponding to 1.3 times the volume of the mixture is then added to the mixture. The resulting suspension is treated in an ultrasonic bath for 3 days at 80° C. (power of the ultrasonic bath=25 watt/l). The water is subsequently taken off in the ultrasonic bath on a rotary evaporator at 50° C. under reduced pressure. This is followed by centrifugation of the glycol suspension (60 minutes at 2500 g) and subsequent dialysis against dionized water until a conductivity of less than 2 $\mu s/cm$ is reached.

(C) Characterization of the iron oxide particles obtained

Particle size:

UPA (Ultrafine Particle Analyzer or "laser light back scattering" in general): $d_{50}$=10 nm Disk centrifuge, $d_{50}$=10 nm TEM (Transmission electron microscope): about 10 nm (primary particle size)

Evaluation of the particle size distribution (UPA) indicates that 80% of all particles are in the size range of from 20% above to 20% below the mean particle diameter, which is sufficient for most applications.

Elemental analysis:

C: 1.0–1.6% by weight

Si: 0.4–0.6% by weight

Surface analysis:

Isoelectric point: pH=8.8–9.6(zeta potential titration)

We claim:

1. A process for producing an-agglomerate-free suspension of stably coated nanosize iron-containing oxide particles, comprising the following steps in the order indicated:
   (1) preparing an aqueous suspension of nanosize iron-containing oxide particles which are partly or completely present in the form of agglomerates;
   (2) adding (i) a trialkoxysilane which has a hydrocarbon group which is directly bound to Si and to which is bound at least one group selected from amino, carboxyl, epoxy, mercapto, cyano, hydroxy, acrylic, and methacrylic, and (ii) a water-miscible polar organic solvent whose boiling point is at least 10° C. above that of water;
   (3) treating the resulting suspension with ultrasound until at least 70% of the particles present have a size within the range from 20% below to 20% above the mean particle diameter;
   (4) removing the water by distillation under the action of ultrasound; and
   (5) removing the agglomerates which have not been broken up.

2. A process according to claim 1, comprising, following step (5), the additional step (6) of deionizing the suspension.

3. A process according to claim 2 wherein step (6) comprises dialyzing the suspension.

4. A process according to claim 1 wherein the iron-containing oxide particles contain iron and from 0 to 70 metal atom % of at least one metal selected from the group consisting of Zn, Cu, Co, Ni and Mn.

5. A process according to claim 4 wherein the iron-containing oxide particles contain from 0 to 35 metal atom % of at least one metal selected from the group consisting of Zn, Cu, Co, Ni and Mn.

6. A process according to claim 1 wherein the iron-containing oxide particles are pure iron oxide particles in which the Fe(II)/Fe(III) ratio is from 1:1 to 1:3.

7. A process according to claim 1 wherein a trialkoxysilane having at least one amino group is used in step (2).

8. A process according to claim 1 wherein the polar organic solvent in step (2) has at least one hydroxyl group.

9. A process according to claim 8 wherein the polar organic solvent has at least two hydroxyl groups.

10. A process according to claim 9 wherein the polar organic solvent is selected from the group consisting of ethylene glycol, propylene glycol, glycerol, trimethylolpropane, diethylene glycol and mixtures of these.

11. A process according to claim 1 wherein step (3) is carried out at a temperature of from 50 to 100° C.

12. A process according to claim 1 wherein step (4) is carried out under reduced pressure and a temperature of not more than 80° C.

13. A process according to claim 1 wherein step (5) is carried out by means of gravity.

14. A process according to claim 13 wherein step (5) is carried out by centrifugation.

15. A process according to claim 1 wherein the iron-containing oxide particles are superparamagnetic iron oxide particles.

16. A process for producing agglomerate-free stably coated nanosize iron-containing oxide particles, comprising preparing an agglomerate-free suspension of stably coated nanosize iron-containing oxide particles by the process of claim 1 followed by removing the liquid medium from the suspension.

17. A process according to claim 16, wherein the iron-containing oxide particles are superparamagnetic iron oxide particles.

18. An agglomerate-free suspension of stably coated nanosize iron-containing oxide particles prepared by the process of claim 1.

19. Agglomerate-free stably-coated nanosize iron-containing oxide particles prepared by the process of claim 16.

20. Agglomerate-free nanosize iron-containing oxide particles provided with a hydrolysis-resistant coating based on aminosilane.

* * * * *